(12) United States Patent
Wueste

(10) Patent No.: US 12,135,047 B2
(45) Date of Patent: Nov. 5, 2024

(54) CYLINDER CONNECTION ASSEMBLY, CYLINDER AND TIGHTENING MODULE

(71) Applicant: ATLAS COPCO INDUSTRIAL TECHNIQUE AB, Stockholm (SE)

(72) Inventor: Michael Wueste, Wesel (DE)

(73) Assignee: ATLAS COPCO INDUSTRIAL TECHNIQUE AB, Stockholm (SE)

( * ) Notice: Subject to any disclaimer, the term of this patent is extended or adjusted under 35 U.S.C. 154(b) by 119 days.

(21) Appl. No.: 17/921,838

(22) PCT Filed: Apr. 29, 2021

(86) PCT No.: PCT/EP2021/061271
§ 371 (c)(1),
(2) Date: Oct. 27, 2022

(87) PCT Pub. No.: WO2021/219789
PCT Pub. Date: Nov. 4, 2021

(65) Prior Publication Data
US 2023/0175535 A1    Jun. 8, 2023

(30) Foreign Application Priority Data

Apr. 30, 2020 (CN) .......................... 202020706199.0

(51) Int. Cl.
*F15B 15/14* (2006.01)
*B23P 19/06* (2006.01)
(Continued)

(52) U.S. Cl.
CPC ............ *F15B 15/149* (2013.01); *B23P 19/06* (2013.01); *B25B 21/00* (2013.01); *B25B 23/04* (2013.01);
(Continued)

(58) Field of Classification Search
CPC ......... B23P 19/06; B25B 21/00; B25B 23/04; F15B 15/1404; F15B 15/1433; F15B 15/1438; F15B 15/1471
See application file for complete search history.

(56) References Cited

U.S. PATENT DOCUMENTS

| 5,101,694 A | * | 4/1992 | Sevelinge | ............... B23P 19/06 |
| | | | | 81/57.24 |
| 6,415,876 B1 | | 7/2002 | Bollinger et al. | |
| 11,149,762 B2 | | 10/2021 | Huang | |

FOREIGN PATENT DOCUMENTS

| CN | 104595275 A | 5/2015 | | |
| CN | 109162982 A | 1/2019 | | |
| CN | 209838800 U | 12/2019 | | |
| DE | 3715142 A1 | 11/1988 | | |
| DE | 102007035959 A1 | * | 2/2009 | ............. B25B 23/04 |
| JP | 08042510 A | 2/1996 | | |

OTHER PUBLICATIONS

DE-102007035959-A1 machine translation. (Year: 2009).*

(Continued)

*Primary Examiner* — Kenneth Bomberg
*Assistant Examiner* — Matthew Wiblin
(74) *Attorney, Agent, or Firm* — Moore & Van Allen PLLC; W. Kevin Ransom

(57) ABSTRACT

Provided is a cylinder connection assembly comprising a ventilation connection sleeve sleeved on a piston shaft of the cylinder, the ventilation connection sleeve fixedly provided in a cylinder barrel of the cylinder and separates an inner cavity of the cylinder barrel to form front and rear air chambers, a first ventilation hole communicating with the front air chamber and a second ventilation hole communicating with the rear air chamber are provided on the ventilation connection sleeve, so that when the compressed gas is filled into the front air chamber through the first ventilation hole, or the compressed gas is filled into the rear air chamber through the second ventilation hole, the piston assembly in the cylinder barrel can move axially. Through the ventilation (Continued)

connection sleeve provided in the cylinder barrel, the compressed gas can directly enter the front air chamber or the rear air chamber through the ventilation hole thereon.

14 Claims, 3 Drawing Sheets

(51) Int. Cl.
    *B25B 21/00*     (2006.01)
    *B25B 23/04*     (2006.01)

(52) U.S. Cl.
    CPC ...... *F15B 15/1433* (2013.01); *F15B 15/1438* (2013.01); *F15B 15/1471* (2013.01); *F15B 2211/7056* (2013.01); *F15B 2211/8855* (2013.01)

(56) References Cited

OTHER PUBLICATIONS

Atlas Copco Industrial Technique AB, International Patent Application No. PCT/EP2021/061271, International Search Report, Jul. 21, 2021.

Atlas Copco Industrial Technique AB, International Patent Application No. PCT/EP2021/061271, Written Opinion, Jul. 21, 2021.

Atlas Copco Industrial Technique AB, International Patent Application No. PCT/EP2021/061271, International Preliminary Report on Patentability, Sep. 15, 2022.

\* cited by examiner

CYLINDER CONNECTION ASSEMBLY, CYLINDER AND TIGHTENING MODULE

CROSS-REFERENCE TO RELATED APPLICATIONS

This application is a National Stage Patent Application (filed under 35 § U.S.C. 371) of PCT/EP2021/061271, filed Apr. 29, 2021, of the same title, which, in turn claims priority to Chinese Patent Application No. 202020706199.0 filed Apr. 30, 2020, of the same title; the contents of each of which are hereby incorporated by reference.

FIELD OF THE INVENTION

The present utility model relates to a technical field of automatic bolt tightening device, in particular to a cylinder connection assembly, a cylinder and a tightening module.

BACKGROUND OF THE INVENTION

At present, the production process of products in the industries such as electronic assembly, hardware accessories, and automobile contain bolt locking technology. The traditional one is to use pure manual operation for bolt locking. However, the technology is not only time-consuming and labor-intensive, but also extremely low in work efficiency. A tightening module has been developed to replace the manual tightening of bolts. The tightening module can achieve the purpose of locking bolts through a bit connection spring thereon and a cylinder for driving the bit to propel rotatably.

However, the existing tightening module usually adds a connecting piece to a side face of a cylinder, through which the compressed gas is transported into the cylinder barrel of the cylinder. However, said connecting piece increases the difficulty in manufacturing the cylinder, so that the manufacturing cost increases and size of the cylinder also increases, which is not convenient for transportation and use.

SUMMARY OF THE INVENTION

In view of the above-mentioned technical problems existing in the prior art, the present utility model provides a cylinder connection assembly, a cylinder and a tightening module, which achieves the purpose of reducing the overall size of the cylinder through a ventilation connection sleeve sleeved on a piston shaft in a cylinder.

The embodiments of the present utility model provide a cylinder connection assembly comprising a ventilation connection sleeve sleeved on a piston shaft of a cylinder, wherein the ventilation connection sleeve is fixedly provided in a cylinder barrel of the cylinder and separates an inner cavity of the cylinder barrel to form a front air chamber and a rear air chamber, a first ventilation hole communicating with the front air chamber and a second ventilation hole communicating with the rear air chamber are provided on the ventilation connection sleeve, so that when the compressed gas is filled into the front air chamber through the first ventilation hole, or when the compressed gas is filled into the rear air chamber through the second ventilation hole, a piston assembly in the cylinder barrel can move axially.

In some embodiments, a third ventilation hole is provided on a first end face of the ventilation connection sleeve close to the front air chamber, a fourth ventilation hole is provided on a second end face of the ventilation connection sleeve close to the rear air chamber, the ventilation connection sleeve is provided with a first gas passage communicating with the first ventilation hole and the third ventilation hole and a second gas passage communicating with the second ventilation hole and the fourth ventilation hole.

In some embodiments, a connection hole for installing a top wire is provided on an outer wall of the ventilation connection sleeve.

In some embodiments, the first ventilation hole and the second ventilation hole are provided next to the connection hole, which is located therebetween.

In some embodiments, the ventilation connection sleeve is in clearance fit with the piston shaft, an accommodating cavity for accommodating a sealing ring is formed therein, the sealing ring is sleeved on the piston shaft and is connected sealingly thereto, and an outer wall of the sealing ring circumferentially seals against a cavity wall of the accommodating cavity.

In some embodiments, external threads for connecting with an inner wall of the cylinder barrel are provided on both ends of the ventilation connection sleeve.

In some embodiments, sealing rings are provided on both the first ventilation hole and the second ventilation hole.

The embodiments of the present utility model also provide a cylinder, comprising the cylinder connection assembly described above.

In some embodiments, the cylinder further comprises a cylinder barrel, a spline shaft, a drive shaft, and a piston assembly; wherein, the drive shaft is sleeved on the spline shaft and is connected to the spline shaft by spline;

the piston assembly includes a piston shaft, and a front piston and a rear piston which are fixedly provided on the piston shaft respectively, the piston shaft is sleeved on the drive shaft and both can move axially in a synchronous way, the ventilation connection sleeve is located between the front piston and the rear piston, the front air chamber is formed between the front piston and the ventilation connection sleeve, the rear air chamber is formed between the rear piston and the ventilation connection sleeve, so that when the compressed gas is filled into the front air chamber or the rear air chamber, the piston assembly moves axially and drives the drive shaft to move axially and circumferentially.

The embodiments of the present utility model also provide a tightening module, comprising the cylinder described above.

Compared with the prior art, the advantageous effects of the embodiments of the present utility model are: the cylinder connection assembly provided by the embodiments of the present utility model comprises a ventilation connection sleeve sleeved on a piston shaft in a cylinder, through which the compressed air is filled into a cylinder, the ventilation connection sleeve separates an inner cavity of a cylinder barrel into a front air chamber and a rear air chamber, so that when the compressed air is filled into the front air chamber through a first ventilation hole on the ventilation connection sleeve, or when the compression gas is filled into to the rear air chamber through a second ventilation hole on the ventilation connection sleeve, a piston in the cylinder barrel can move axially under the action of air pressure of the compressed gas. In the prior art, it is necessary to add a connecting piece on a side face of a cylinder and increase a wall thickness of a cylinder barrel to realize the intake of a cylinder, but the embodiments of the present application effectively solve the problem of adding the connecting piece and increasing the wall thickness of the cylinder barrel, which effectively reduces the distance from an axis of a cylinder barrel to an outer wall of a cylinder barrel and the size of a wall thickness of a cylinder barrel by providing a ventilation connection sleeve in a cylinder barrel, i.e., reducing the size of the cylinder barrel of the cylinder. Therefore, when facing the problem that two bolts that are relatively close to each other cannot be tightened on the structure to be locked simultaneously, two cylinders with the ventilation connection sleeve can reduce the size of the tightening module containing the cylinder due to the reduction of the size of the cylinder barrel, so as to realize tightening two bolts close to each other simultaneously by adopting two tightening modules, facilitating the user to use the tightening module for assembly.

BRIEF DESCRIPTION OF THE DRAWINGS

In the accompanying drawings which are not necessarily drawn to scale, the same reference signs may describe similar components in different views. Same reference signs with letter suffixes or different letter suffixes may indicate different examples of similar components. The drawings generally illustrate various embodiments by way of example but not a limitation and serve to explain the disclosed embodiments together with the description and claims. When appropriate, the same reference signs are used in all the drawings to refer to the same or similar parts. Such embodiments are illustrative but are not intended to be exhaustive or exclusive embodiments of the present device or method.

The components represented by the reference signs in the figures.

100—tightening module; 200—cylinder; 300—cylinder connection assembly; 1—ventilation connection sleeve; 11—first ventilation hole; 12—second ventilation hole; 13—third ventilation hole; 14—connection hole; 15—accommodating cavity; 16—sealing ring; 17—external thread; 2—cylinder barrel; 3—front air chamber; 4—rear air chamber; 5—spline shaft; 6—drive shaft; 7—piston assembly; 71—piston shaft; 72—front piston; 73—rear piston; 74—bearing; 8—top wire.

DETAILED DESCRIPTION OF EMBODIMENTS

In order to make the technical solutions of the present utility model better understood by a person skilled in the art, the present utility model will be explained in detail in reference to the drawings and specific embodiments. The embodiments of the present utility model will be further described in detail in reference to the drawings and specific embodiments, but not as a limitation of the present utility model.

A "first", "second" and similar words used in the present utility model do not indicate any order, quantity or importance, but are only used to distinguish different parts. Similar words such as "comprise" or "contain" mean that the elements listed before said word covers the elements listed thereafter, and the possibility of covering other elements is not excluded. "Up", "down", "left", "right", etc., are only used to indicate the relative positional relationship, and when the absolute position of the described object changes, the relative positional relationship may also be changed accordingly.

In the present utility model, when it is described that a specific device is located between a first device and a second device, there may or may not be an intermediate device between the specific device and a first device or a second device. When it is described that a specific device is connected to other devices, the specific device may be directly connected to other devices without an intermediate device, or may not be directly connected to other devices but with an intermediate device.

All terms (including technical terms or scientific terms) used in the present utility model have the same meaning understood by a person of ordinary skill in the art of the present utility model unless otherwise defined specifically. It should also be understood that the terms such as those defined in general-purpose dictionaries should be interpreted as having meanings consistent with those in the context of related technologies, and should not be interpreted in idealized or extremely formalized meanings unless it is defined in this way explicitly.

The technologies, methods, and devices known to a person of ordinary skill in the relevant art may not be discussed in detail, but where appropriate, the technologies, methods and devices should be regarded as a part of the specification.

Figure 1:
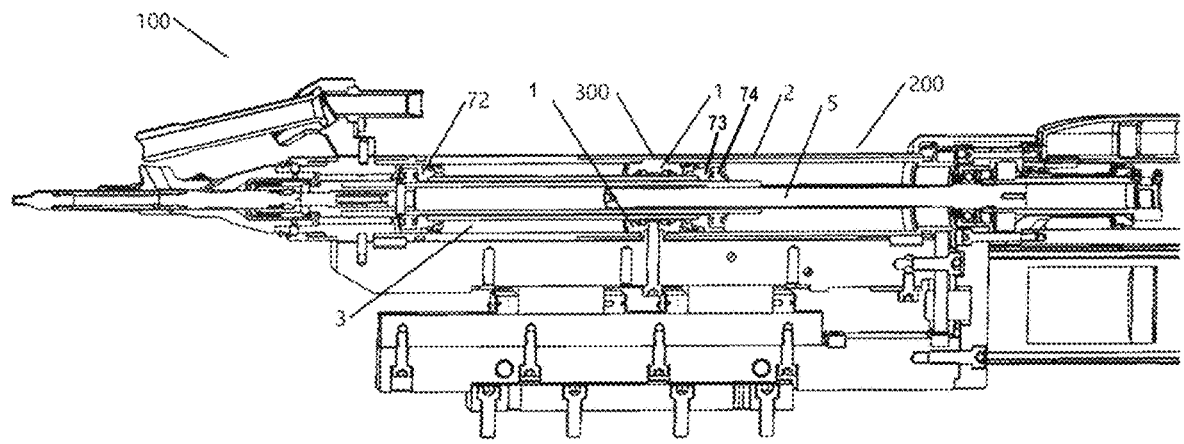
FIG. 1 is a structural diagram of a tightening module containing a cylinder in the embodiment of the present utility model.
Figure 2:
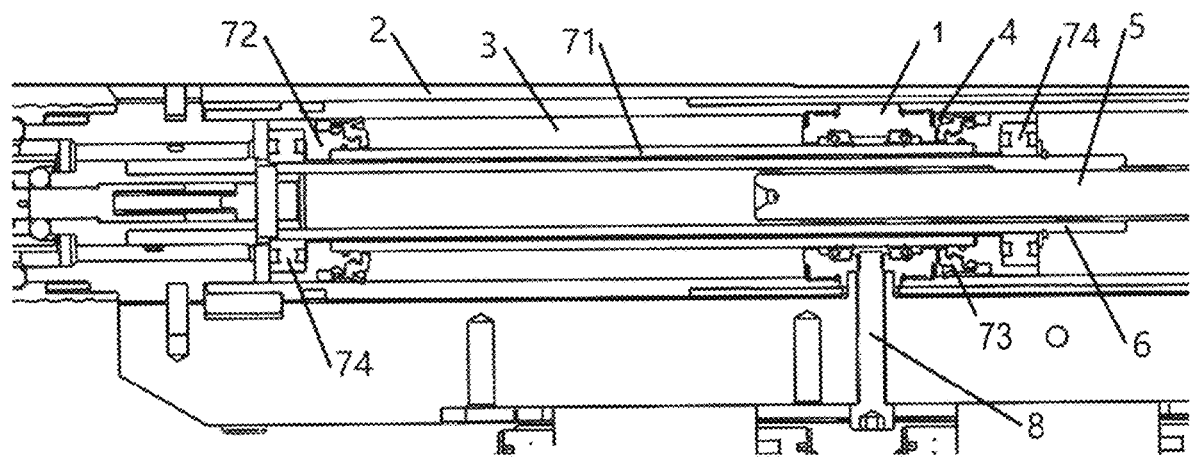
FIG. 2 is a structural diagram of a cylinder in the embodiment of the present utility model.
Figure 3:
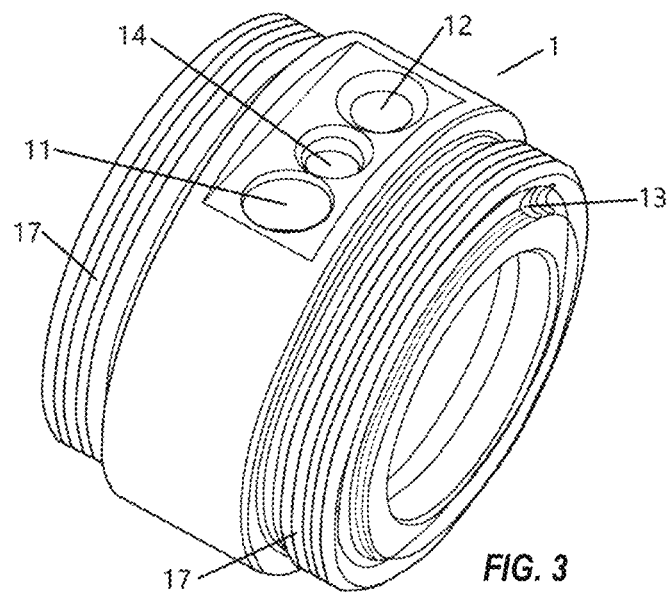
FIG. 3 is a structural diagram of a ventilation connection sleeve of a cylinder connection assembly in the embodiment of the present utility model.

The embodiments of the present utility model provide a cylinder connection assembly 300, which is applied to a cylinder 200. On the basis of common sense, a person skilled in the art knows that the cylinder 200 may include a cylinder barrel 2, a piston that reciprocates therein, and a piston shaft 71 connected to the piston. The cylinder connection assembly 300 comprises a ventilation connection sleeve 1 sleeved on the piston shaft 71 of the cylinder 200. As shown in FIGS. 1 and 2, the ventilation connection sleeve 1 is fixedly provided in the cylinder barrel 2 of the cylinder 200, which separates an inner cavity of the cylinder barrel 2 to form a front air chamber 3 and a rear air chamber 4. A first ventilation hole communicating with the front air chamber 3 and a second ventilation hole 12 communicating with the rear air chamber 4 are provided on the ventilation connection sleeve 1 (as shown in FIG. 3), so that when the compressed gas is filled into the front air chamber 3 through the first ventilation hole 11, or when the compressed gas is filled into the rear air chamber 4 through the second ventilation hole 12, a piston assembly 7 in the cylinder barrel 2 can move axially.

Understandably, said ventilation connection sleeve 1 is fixedly provided in the cylinder barrel 2 without moving along with the piston, and separates the chamber in the cylinder barrel 2 into the front air chamber 3 and the rear air chamber 4 (as shown in FIG. 2). The piston in the cylinder 200 as shown in FIG. 2 is in a state where the volume of the front air chamber 3 is the largest and the volume of the rear air chamber 4 is the smallest.

Further, the front air chamber 3 is formed between a front piston 72 and the ventilation connection sleeve 1 in the cylinder 200, and the rear air chamber 4 is formed between a rear piston 73 and the ventilation connection sleeve 1 in the cylinder 200. When the compressed gas is filled into the front air chamber 3 through the first ventilation hole 11 on the ventilation connection sleeve 1, the front piston 72 moves in a direction away from the ventilation connection sleeve 1 until it moves to the position where the front piston 72 is located as shown in FIG. 2, and at this time, to keep the balance of air pressure inside the cylinder barrel 2, the second ventilation hole 12 on the ventilation connection sleeve 1 discharges the gas in the rear air chamber 4, i.e., when the compressed gas is filled through the first ventilation hole 11, the second ventilation hole 12 will exhaust.

When the compressed gas is filled into the rear air chamber 4 through the second ventilation hole 12 on the ventilation connection sleeve 1, the rear piston 73 moves in a direction away from the ventilation connection sleeve 1 from the position where the rear piston 73 is located as shown in FIG. 2. At this time, to keep the balance of air pressure in the cylinder barrel 2, the first ventilation hole 11 on the ventilation connection sleeve 1 discharges the gas in the front air chamber 3, i.e., when the compressed gas is filled through the second ventilation hole 12, the first ventilation hole 11 will exhaust.

It is understandable that the ventilation connection sleeve 1 can be detachably provided in the cylinder barrel 2 stably.

The cylinder connection assembly 300 provided by the embodiment of the present utility model comprises the ventilation connection sleeve 1 sleeved on the piston shaft 71 in the cylinder 200, the compressed gas is filled into the cylinder 200 through the ventilation connection sleeve 1, and the ventilation connection sleeve 1 separates the inner cavity of the cylinder barrel 2 into the front air chamber 3 and the rear air chamber 4, so that when the compressed gas is filled into the front air chamber 3 through the first ventilation hole 11 on the ventilation connection sleeve 1, or the compressed gas is filled into the rear air chamber 4 through the second ventilation hole 12 on the ventilation connection sleeve 1, the piston in the cylinder barrel 2 of the cylinder 200 can move axially under the action of the air pressure of the compressed gas. However, in the prior art, it is necessary to add a connecting piece on a side face of the cylinder 200 and increase a wall thickness of the cylinder barrel 2 to achieve the air intake of the cylinder 200. The embodiments of the present application effectively solve the problem of adding a connecting piece and increasing the wall thickness of the cylinder barrel 2, which effectively reduces the distance between an axis of the cylinder barrel 2 and an outer wall of the cylinder barrel 2, and the size of the wall thickness of the cylinder barrel 2 by providing the ventilation connection sleeve 1 in the cylinder barrel 2, i.e., the size of the cylinder barrel 2 of the cylinder 200 can be reduced. Therefore, when facing the problem that two bolts that are relatively close to each other cannot be tightened on the structure to be locked simultaneously, two cylinders 200 with the ventilation connection sleeve 1 can reduce the size of the tightening module 100 containing the cylinder 200 due to the reduction of the size of the cylinder barrel 2, so as to realize tightening the two bolts close to each other simultaneously by adopting two tightening modules 100, facilitating the user to use the tightening module 100 for assembly.

In some embodiments, a third ventilation hole 13 is provided on a first end face of the ventilation connection sleeve 1 close to the front air chamber 3 (as shown in FIG. 3), a fourth ventilation hole is provided on a second end face of the ventilation connection sleeve 1 close to the rear air chamber 4 (not shown in the figures), and the ventilation connection sleeve 1 is provided with a first gas passage communicating with the first ventilation hole 11 and the third ventilation hole 13, and a second gas passage communicating with the second ventilation hole 12 and the fourth ventilation hole. FIG. 3 shows that the number of the third ventilation holes 13 is two, which is not specifically limited in the present application, as long as the compressed gas can quickly enter the cylinder barrel 2 of the cylinder 200.

It can be understood that the first gas passage and the second gas passage are integrally formed in the ventilation connection sleeve 1 to ensure the circulation of gas and facilitate the mass production of products.

In some embodiments, a connection hole 14 for installing a top wire 8 is provided on an outer wall of the ventilation connection sleeve 1. As shown in FIGS. 2 and 3, one end of the top wire 8 penetrates the cylinder barrel 2 of the cylinder 200 and abuts against the ventilation connection sleeve 1, so as to make the ventilation connection sleeve 1 placed in the cylinder barrel 2 stably. This connection manner is simple and easy to disassemble.

In some embodiments, the first ventilation hole 11 and the second ventilation hole 12 are provided next to the connection hole 14, which is located therebetween. As shown in FIG. 3, the first ventilation hole 11, the connection hole 14 and the second ventilation hole 12 are provided close to each other compactly, so that the structure is compact and the layout is reasonable.

Figure 4:
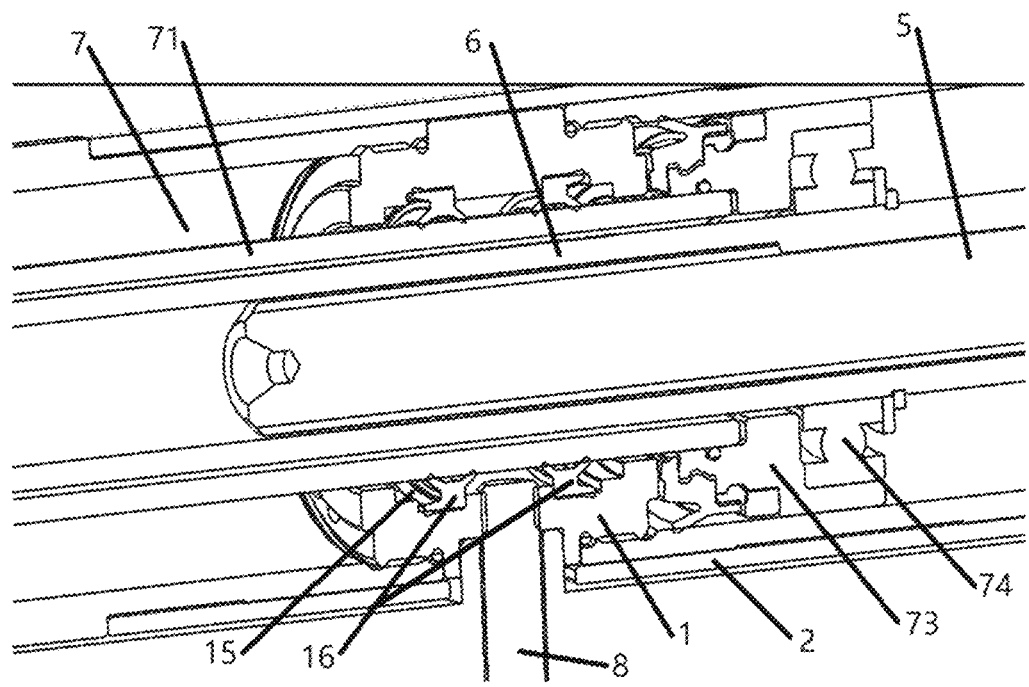
FIG. 4 is an enlarged view of the local structure of a cylinder in the embodiment of the present utility model.
Figure 5:
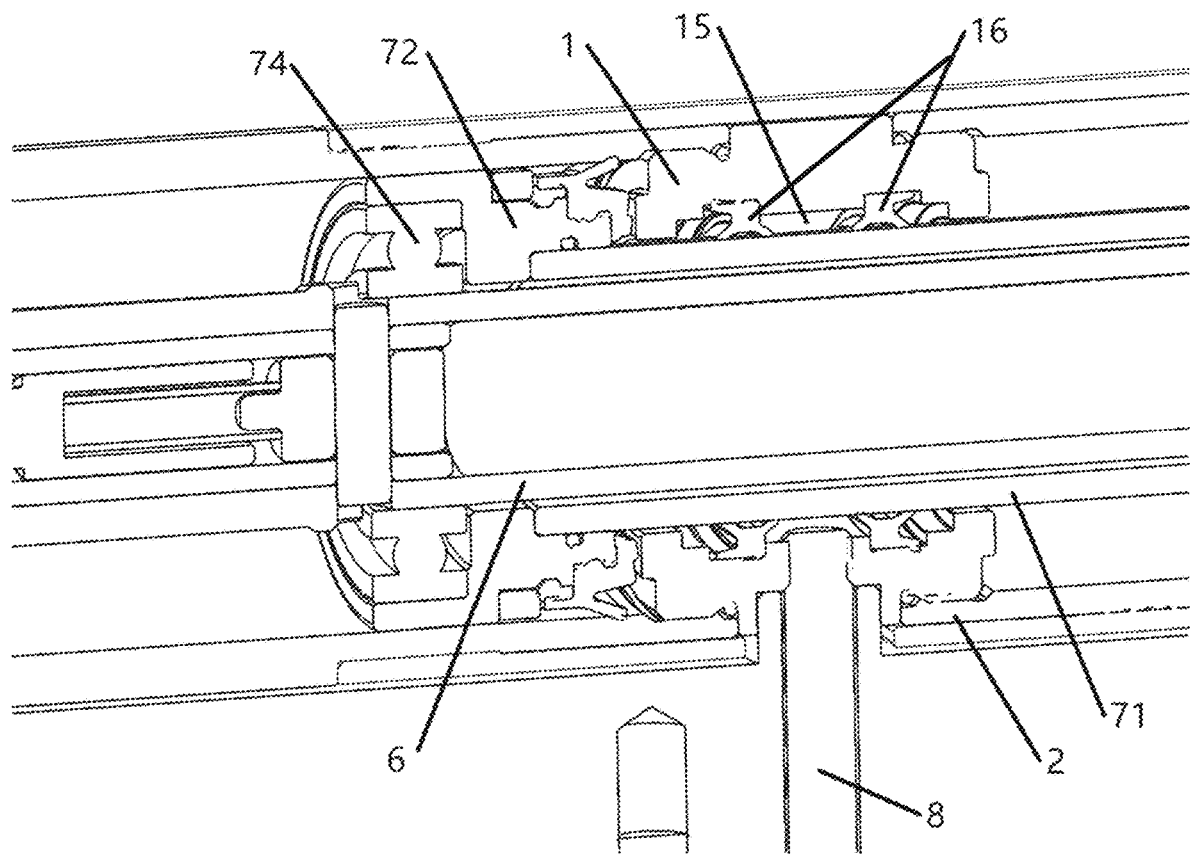
FIG. 5 is another enlarged view of the local structure of a cylinder in the embodiment of the present utility model.

In some embodiments, the ventilation connection sleeve 1 is in clearance fit with the piston shaft 71 (as shown in FIGS. 4 and 5), and an accommodating cavity 15 for accommodating a sealing ring 16 is formed in the ventilation connection sleeve 1. The sealing ring 16 is sleeved on the piston shaft 71 and connected sealingly thereto, and an outer wall of the sealing ring 16 seals against a cavity wall of the accommodating cavity 15 circumferentially. Due to the reciprocation of the piston shaft 71, friction is generated between the piston shaft 71 and the ventilation connection sleeve 1 thereon. However, the clearance fit of the ventilation connection sleeve 1 and the piston shaft 71 can reduce the hindrance generated by the friction to the movement of the piston shaft 71, and through the sealing ring 16 in the accommodating cavity 15, the front air chamber 3 and the rear air chamber 4 are isolated to prevent the compressed gas in the front air chamber 3 and the rear air chamber 4 from flowing from one chamber to another.

In some embodiments, external threads 17 for connecting an inner wall of the cylinder barrel 2 are provided on both ends of the ventilation connection sleeve 1, as shown in FIG. 3. This connection manner is easy to disassemble and the configuration of structure is simple and easy to process.

In some embodiments, the sealing rings are provided on both the first ventilation hole 11 and the second ventilation hole 12 to prevent the compressed gas from leaking and increase the tightness of the ventilation connection sleeve 1.

The embodiments of the present utility model also provide the cylinder 200, which includes the cylinder connection assembly 300. The cylinder 200 with the cylinder connection assembly 300 makes the compressed gas directly enter the front air chamber 3 or the rear air chamber 4 through the ventilation hole thereon, thereby achieving the purpose of reducing the size of the cylinder 200 and the compact structure.

In some embodiments, the cylinder 200 further comprises a cylinder barrel 2, a spline shaft 5, a drive shaft 6 and a piston assembly 7. As shown in FIGS. 2 to 5, the drive shaft 6 is sleeved on the spline shaft 5 and is connected to the spline shaft 5 by spline. It can be understood that the drive shaft 6 sleeve can move axially and rotate circumferentially, and the spline shaft 5 can rotate circumferentially with the drive shafts 6 sleeve in the cylinder barrel 2. The piston assembly 7 includes a piston shaft 71, and a front piston 72

(as shown in FIG. 5) and a rear piston 73 (as shown in FIG. 4) which are respectively fixedly provided on the piston shaft 71, and the piston shaft 71 is sleeved on the drive shaft 6 and both can move axially in a synchronous way. That is, the front piston 72 and the rear piston 73 of the piston assembly 7 can drive the piston shaft 71 to move axially, and the axial movement of the piston shaft 71 enables the drive shaft 6 to rotate circumferentially while moving axially. Wherein the front piston 72 and the rear piston 73 can be sleeved on the drive shaft 6 through a bearing 74.

Further, the ventilation connection sleeve 1 of the cylinder connection assembly 300 is located between the front piston 72 and the rear piston 73 (as shown in FIG. 2), the front air chamber 3 is formed between the front piston 72 and the ventilation connection sleeve 1, and the rear air chamber 4 is formed between the rear piston 73 and the ventilation connection sleeve 1, so that when the compressed gas is filled into the front air chamber 3 or the rear air chamber 4, the piston assembly 7 moves axially and drives the drive shaft 6 to move axially and circumferentially.

It can be understood that when the compressed gas is filled into the front air chamber 3 through the first ventilation hole 11 on the ventilation connection sleeve 1, the front piston 72 moves in a direction away from the ventilation connection sleeve 1 until it moves to the position where the front piston 72 is located as shown in FIG. 2, and at this time, the front piston 72 drives the piston shaft 71 to move axially, and the piston shaft 71 drives the drive shaft 6 to move axially in a synchronous way along therewith. As the drive shaft 6 and the spline shaft 5 are connected by spline, the drive shaft 6 can rotate circumferentially while moving axially.

When the compressed gas is filled into the rear air chamber 4 through the second ventilation hole 12 on the ventilation connection sleeve 1, the rear piston 73 is located at the position as shown in FIG. 2, and at this time, the rear piston 73 drives the piston shaft 71 to move axially, and the piston shaft 71 drives the drive shaft 6 to move axially in a synchronous way therewith. As the drive shaft 6 and the spline shaft 5 are connected by a spline, the drive shaft 6 can move circumferentially while moving axially.

The embodiments of the present utility model also provide a tightening module 100, which comprises the cylinder 200, and can also comprise a bit assembly for tightening bolts. The cylinder 200 comprises a cylinder connection assembly 300, the front air chamber 3 of the ventilation connection sleeve 1 is closer to the bit assembly relative to the rear air chamber 4. When the gas is filled into the front air chamber 3, the cylinder 200 will drive the bit assembly connected thereto to rotate and move outwardly, so as to rapidly realize the bolt connection through the tightening module 100.

In addition, although the exemplary embodiments have been described herein, the scope thereof comprises any and all embodiments having equivalent elements, modifications, omissions, combinations (for example, cross-over solutions of various embodiments), adaptations, or changes based on the present utility model. The elements in the claims will be interpreted broadly based on the language adopted in the claims, and are not limited to the examples described in this specification or during the implementation of the present application, and the examples will be interpreted as non-exclusive. Therefore, this specification and examples are intended to be regarded as examples only, and the true scope and spirit are indicated by the full scope of the following claims and their equivalents.

The above description is intended to be illustrative but not restrictive. For example, the above examples (or one or more solutions) can be used in combination with each other. For example, a person of ordinary skill in the art may use other embodiments when reading the above description. In addition, in the above specific embodiments, various features may be grouped to simplify the present utility model. This should not be interpreted as intent that an unclaimed disclosed feature is necessary for any claim. On the contrary, the subject matter of the present utility model may be less than all the features of a specific disclosed embodiment. Thus, the following claims are incorporated into the specific embodiments as examples or embodiments, wherein each claim is independently regarded as a separate embodiment, and it is considered that these embodiments can be combined or arranged in various combinations of each other. The scope of the present utility model should be determined with reference to the full scope of the appended claims and equivalent forms entitled by these claims.

The above embodiments are merely exemplary embodiments of the present utility model and are not used to limit the present utility model, and the protection scope of the present utility model is defined by the claims. A person skilled in the art can make various modifications or equivalent substitutions to the present utility model within the essence and protection scope of the present utility model, and such modifications or equivalent substitutions should also be regarded as falling within the protection scope of the present utility model.

The invention claimed is:

1. A cylinder, comprising a cylinder connection assembly comprising a ventilation connection sleeve sleeved on a piston shaft of the cylinder, wherein the ventilation connection sleeve is fixedly provided in a cylinder barrel of the cylinder and separates an inner cavity of the cylinder barrel to form a front air chamber and a rear air chamber, a first ventilation hole communicating with the front air chamber and a second ventilation hole communicating with the rear air chamber are provided on the ventilation connection sleeve, so that when a compressed gas is filled into the front air chamber through the first ventilation hole, or when the compressed gas is filled into the rear air chamber through the second ventilation hole, a piston assembly in the cylinder barrel can move axially, wherein the cylinder further comprises a spline shaft and a drive shaft; wherein, the drive shaft is sleeved on the spline shaft and is connected to the spline shaft by spline;

the piston assembly comprises the piston shaft, and a front piston and a rear piston which are each fixedly provided on the piston shaft, the piston shaft is sleeved on the drive shaft and both can move axially in a synchronous way, the ventilation connection sleeve is located between the front piston and the rear piston, the front air chamber is formed between the front piston and the ventilation connection sleeve, the rear air chamber is formed between the rear piston and the ventilation connection sleeve, so that when the compressed air is filled into the front air chamber or the rear air chamber, the piston assembly moves axially and drives the drive shaft to move axially and circumferentially.

2. A cylinder according to claim 1, wherein a third ventilation hole is provided on a first end face of the ventilation connection sleeve close to the front air chamber, a fourth ventilation hole is provided on a second end face of the ventilation connection sleeve close to the rear air chamber, and the ventilation connection sleeve is provided with a first gas passage communicating with the first ventilation hole and the third ventilation hole and a second gas passage communicating with the second ventilation hole and the fourth ventilation hole.

3. A cylinder according to claim 1, wherein a connection hole for installing a top wire is provided on an outer wall of the ventilation connection sleeve.

4. A cylinder according to claim 3, wherein the first ventilation hole and the second ventilation hole are provided next to the connection hole, which is located therebetween.

5. A cylinder according to claim 1, wherein the ventilation connection sleeve is in clearance fit with the piston shaft, an accommodating cavity for accommodating a sealing ring is formed therein, a sealing ring is sleeved on the piston shaft and is connected sealingly thereto, and an outer wall of the sealing ring circumferentially seals against a cavity wall of the accommodating cavity.

6. A cylinder according to claim 1, wherein the ventilation connection sleeve is in clearance fit with the piston shaft, wherein two or more sealing rings are provided on the piston shaft and connected sealingly thereto, wherein an outer wall of each sealing ring circumferentially seals against a cavity wall of an accommodating cavity.

7. A cylinder according to claim 1, wherein external threads for connecting with an inner wall of the cylinder barrel are provided on both ends of the ventilation connection sleeve.

8. A tightening module comprising a cylinder comprising a cylinder connection assembly comprising a ventilation connection sleeve sleeved on a piston shaft of the cylinder, wherein the ventilation connection sleeve is fixedly provided in a cylinder barrel of the cylinder and separates an inner cavity of the cylinder barrel to form a front air chamber and a rear air chamber, a first ventilation hole communicating with the front air chamber and a second ventilation hole communicating with the rear air chamber are provided on the ventilation connection sleeve, so that when a compressed gas is filled into the front air chamber through the first ventilation hole, or when a compressed gas is filled into the rear air chamber through the second ventilation hole, a piston assembly in the cylinder barrel can move axially, wherein the cylinder further comprises a spline shaft and a drive shaft; wherein, the drive shaft is sleeved on the spline shaft and is connected to the spline shaft by spline;

the piston assembly comprises the piston shaft, and a front piston and a rear piston which are each fixedly provided on the piston shaft, the piston shaft is sleeved on the drive shaft and both can move axially in a synchronous way, the ventilation connection sleeve is located between the front piston and the rear piston, the front air chamber is formed between the front piston and the ventilation connection sleeve, the rear air chamber is formed between the rear piston and the ventilation connection sleeve, so that when the compressed air is filled into the front air chamber or the rear air chamber, the piston assembly moves axially and drives the drive shaft to move axially and circumferentially.

9. A tightening module according to claim 8, wherein a third ventilation hole is provided on a first end face of the ventilation connection sleeve close to the front air chamber, a fourth ventilation hole is provided on a second end face of the ventilation connection sleeve close to the rear air chamber, and the ventilation connection sleeve is provided with a first gas passage communicating with the first ventilation hole and the third ventilation hole and a second gas passage communicating with the second ventilation hole and the fourth ventilation hole.

10. A tightening module according to claim 8, wherein a connection hole for installing a top wire is provided on an outer wall of the ventilation connection sleeve.

11. A tightening module according to claim 10, wherein the first ventilation hole and the second ventilation hole are provided next to the connection hole, which is located therebetween.

12. A tightening module according to claim 8, wherein the ventilation connection sleeve is in clearance fit with the piston shaft, an accommodating cavity for accommodating a sealing ring is formed therein, a sealing ring is sleeved on the piston shaft and is connected sealingly thereto, and an outer wall of the sealing ring circumferentially seals against a cavity wall of the accommodating cavity.

13. A cylinder according to claim 8, wherein the ventilation connection sleeve is in clearance fit with the piston shaft, wherein two or more sealing rings are provided on the piston shaft and connected sealingly thereto, wherein an outer wall of each sealing ring circumferentially seals against a cavity wall of an accommodating cavity.

14. A tightening module according to claim 8, wherein external threads for connecting with an inner wall of the cylinder barrel are provided on both ends of the ventilation connection sleeve.

* * * * *

UNITED STATES PATENT AND TRADEMARK OFFICE
CERTIFICATE OF CORRECTION

PATENT NO. : 12,135,047 B2
APPLICATION NO. : 17/921838
DATED : November 5, 2024
INVENTOR(S) : Michael Wueste Page 1 of 1

It is certified that error appears in the above-identified patent and that said Letters Patent is hereby corrected as shown below:

In the Claims

In Column 10, Claim 13, Line 36, "cylinder" should be changed to --tightening module--

Signed and Sealed this
Second Day of September, 2025

Coke Morgan Stewart
*Acting Director of the United States Patent and Trademark Office*